(12) United States Patent
Zwegers et al.

(10) Patent No.: US 12,344,241 B2
(45) Date of Patent: Jul. 1, 2025

(54) SYSTEMS AND METHODS FOR NAVIGATING A TRAILER WITH A VEHICLE WHEN A PHYSICAL CONNECTION DISCONNECTS

(71) Applicant: Toyota Motor Eng & Mfg N.A., Inc., Plano, TX (US)

(72) Inventors: Corey Zwegers, Dexter, MI (US); Danil V. Prokhorov, Canton, MI (US); Sergei S. Avedisov, Los Gatos, CA (US); Paul Timothy Fanson, Howell, MI (US); Gregg J. Overfield, Canton, MI (US); Miles J. Johnson, Ann Arbor, MI (US); Shigenori Shibata, Ann Arbor, MI (US); Adam R. VanAntwerp, Chelsea, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 310 days.

(21) Appl. No.: 17/668,926

(22) Filed: Feb. 10, 2022

(65) Prior Publication Data
US 2023/0249680 A1 Aug. 10, 2023

(51) Int. Cl.
*B60W 30/095* (2012.01)
*B60W 10/18* (2012.01)
(Continued)

(52) U.S. Cl.
CPC ........ *B60W 30/0956* (2013.01); *B60W 10/18* (2013.01); *B60W 10/20* (2013.01);
(Continued)

(58) Field of Classification Search
CPC .. B60W 30/0956; B60W 10/18; B60W 10/20; B60W 30/06; B60W 30/165; B60W 50/14; B60W 2300/14; B60W 2420/403; B60W 2530/203; B60W 2556/65; B60W 2710/18; B60W 2710/20; B60W 2720/10; B60W 2754/30; B60W 60/00186;
(Continued)

(56) References Cited

U.S. PATENT DOCUMENTS

| 5,421,600 A | 6/1995 | Jones et al. |
| 7,860,639 B2 | 12/2010 | Yang |

(Continued)

FOREIGN PATENT DOCUMENTS

WO 2017204712 A1 11/2017

*Primary Examiner* — Hunter B Lonsberry
*Assistant Examiner* — Henry R Hinton
(74) *Attorney, Agent, or Firm* — Christopher G. Darrow; Darrow Mustafa PC

(57) ABSTRACT

Systems, methods, and other embodiments described herein relate to navigating a trailer after the physical connection between a vehicle and trailer disconnects. In one embodiment, a method includes responsive to determining that a physical connection between a vehicle and a trailer has disconnected, determining trajectory information for navigating the trailer without a connection to the vehicle. The method includes communicating the trajectory information to the trailer to cause the trailer to follow a trajectory associated with the vehicle. The method includes monitoring whether the trailer is following the trajectory.

17 Claims, 7 Drawing Sheets

(51) Int. Cl.
  *B60W 10/20* (2006.01)
  *B60W 30/06* (2006.01)
  *B60W 30/165* (2020.01)
  *B60W 50/14* (2020.01)
  *G06T 7/50* (2017.01)
  *G06T 7/70* (2017.01)

(52) U.S. Cl.
  CPC .......... *B60W 30/06* (2013.01); *B60W 30/165* (2013.01); *B60W 50/14* (2013.01); *G06T 7/50* (2017.01); *G06T 7/70* (2017.01); *B60W 2300/14* (2013.01); *B60W 2420/403* (2013.01); *B60W 2530/203* (2020.02); *B60W 2556/65* (2020.02); *B60W 2710/18* (2013.01); *B60W 2710/20* (2013.01); *B60W 2720/10* (2013.01); *B60W 2754/30* (2020.02); *G06T 2207/30252* (2013.01)

(58) Field of Classification Search
  CPC ... G06T 7/50; G06T 7/70; G06T 2207/30252; B60T 8/00; B62D 59/04
  See application file for complete search history.

(56) References Cited

U.S. PATENT DOCUMENTS

| | | | |
|---|---|---|---|
| 10,078,338 | B2 | 9/2018 | Smartt et al. |
| 10,160,428 | B2 | 12/2018 | Ewel |
| 10,699,561 | B2 | 6/2020 | Robinson |
| 11,485,330 | B1* | 11/2022 | Kulkarni ................... B60D 1/62 |
| 2010/0065344 | A1* | 3/2010 | Collings, III ............. B60L 3/10 180/2.1 |
| 2019/0118829 | A1* | 4/2019 | Goldberg ............... B60W 30/16 |
| 2019/0233034 | A1* | 8/2019 | Viele ........................ B60D 1/36 |
| 2019/0367107 | A1* | 12/2019 | Grossman ............ B62D 53/125 |
| 2020/0057453 | A1* | 2/2020 | Laws ................... G05D 1/0295 |
| 2020/0064140 | A1 | 2/2020 | Tarkianinen et al. |
| 2020/0233410 | A1* | 7/2020 | Burns ..................... B60L 50/66 |
| 2020/0380871 | A1 | 12/2020 | Hitomi et al. |
| 2020/0398803 | A1* | 12/2020 | Oba ........................ B60T 8/1708 |
| 2021/0039460 | A1* | 2/2021 | Niewiadomski .......... B60R 1/26 |
| 2021/0294351 | A1* | 9/2021 | Wiberg ................. G05D 1/0293 |
| 2023/0249746 | A1* | 8/2023 | Weston .................. B62D 13/00 280/426 |
| 2023/0312029 | A1* | 10/2023 | Layfield ................ B60D 1/015 180/6.5 |

* cited by examiner

SYSTEMS AND METHODS FOR NAVIGATING A TRAILER WITH A VEHICLE WHEN A PHYSICAL CONNECTION DISCONNECTS

TECHNICAL FIELD

The subject matter described herein relates, in general, to controlling a trailer without a physical connection between the trailer and a vehicle, and, more particularly, to navigating a trailer after a physical connection between the vehicle and trailer disconnects.

BACKGROUND

Towing a trailer with a vehicle uses a physical connection, such as the combination of a ball and a hitch. An issue arises, however, when, during the operation of towing a trailer, the physical connection breaks, disconnects, or the like. For example, if the physical connection between a vehicle and a trailer becomes disconnected while the vehicle and the trailer are in motion, the trailer will lose control, which can lead to a collision or damage to the vehicle, trailer, other vehicles, pedestrians, infrastructure, and so on.

Approaches for mitigating disconnect events include, for example, stopping the motion of the trailer or failover devices that attempt to maintain a secondary connection. One approach implements a breakaway switch, which is a device that automatically activates the brakes of the trailer when the trailer becomes disconnected. Such an approach entails a sudden trailer stop. This does not always provide sufficient time for stopping among other vehicles on the road or function effectively, leading to dangerous vehicle maneuvers to avoid hitting the stopped trailer. Moreover, to move the stopped trailer away from traffic, a user physically reconnects the trailer to a vehicle. Consequently, the current approaches suffer from difficulties associated with safe road conditions and recovering the trailer.

SUMMARY

Example systems and methods disclosed herein relate to mitigating safety risks associated with the disconnection of a physical connection between a trailer and a vehicle while in motion. As previously noted, a physical connection between a vehicle and trailer becoming disconnected can result in uncontrolled trailer movements and sudden stops, potentially resulting in a collision. Because a trailer moves in accordance with the vehicle, when a physical connection breaks, the trailer is not able to maneuver, thereby causing significant safety concerns.

Therefore, in one embodiment, a wireless towing system is disclosed that allows for a vehicle to continue navigating a trailer in the event of a physical connection between the vehicle and trailer disconnecting. In one approach, the vehicle automatically detects a disconnected physical connection using sensor information, such as a physical connection sensor, image recognition or navigation data associated with the current location of the trailer in relation to the vehicle. Because the direct physical connection is no longer present, the vehicle may initially establish a wireless communication link with the trailer or at least ensure an existing communication remains available. A wireless communication link sends the trailer instructions since the physical connection is no longer present (i.e., the method that the vehicle typically uses to communicate with the trailer is no longer present). Further, in one configuration, in response to the physical connection disconnecting, the trailer activates a mobility component such as a front wheel to facilitate movement of the trailer.

In at least one arrangement, the vehicle automatically generates and wirelessly communicates a trajectory associated with the path of the vehicle for the trailer to follow so that the trailer does not suddenly stop in the middle of traffic in case of a disconnect event. The trailer automatically receives the trajectory over the wireless communication link and follows it accordingly. Communicating a trajectory to the trailer may also include communicating a desired speed for the trailer to follow, braking requests, steering requests, and a safe following distance for the trailer to maintain among other attributes. The controls ensure that, for example, the trailer is following behind the vehicle as if the physical connection is still present although at a greater distance.

In a further aspect, the vehicle, in one approach, monitors whether the trailer is following the trajectory using sensors, such as cameras, radars, LiDARs, a GPS, or the like. If the trailer is not following the communicated trajectory, the vehicle, in one embodiment, may automatically send a new trajectory for the trailer to follow to prevent unwanted events, such as a collision. The new trajectory may be associated with following a second vehicle on the road. Following the second vehicle is a backup method that allows the trailer to continue traversing the road if, for some reason, the trailer is not establishing the appropriate connection necessary to follow the vehicle it was originally connected to. In this way, the vehicle maintains control over the trailer despite a disconnected physical connection until the vehicle commands the trailer to stop. In one arrangement, when the vehicle reaches a safe area on the road where the vehicle and trailer can both safely pull over, the vehicle communicates a stop signal to the trailer. A human machine interface (HMI) may receive an electronic input specifying a stop condition or the system automatically sends the stop signal when the vehicle successfully pulls over and parks on the side of the road. In either case, the stop signal commands the trailer to pull over behind the vehicle to end wireless trailer manipulation. In this way, the trailer system improves the operation of a vehicle with a trailer by automatically taking and maintaining control of the trailer when a physical connection between the vehicle and the trailer is lost, and a driver can reconnect the physical connection between the vehicle and trailer safely and away from traffic once the vehicle and trailer reach a safe stopping point.

In one embodiment, a system is disclosed. The system includes one or more processors and a memory communicably coupled to the one or more processors. The memory stores a control module including instructions that when executed by the one or more processors cause the one or more processors to in response to determining that a physical connection between a vehicle and a trailer has disconnected, determine trajectory information for navigating the trailer without a connection to the vehicle. The control module includes instructions to communicate the trajectory information to the trailer to cause the trailer to follow a trajectory associated with the vehicle. The control module includes instructions to monitor whether the trailer is following the trajectory.

In one embodiment, a non-transitory computer-readable medium including instructions that when executed by one or more processors cause the one or more processors to perform one or more functions is disclosed. The instructions include instructions to responsive to determining that a physical connection between a vehicle and a trailer has disconnected, determine trajectory information for navigating the trailer without a connection to the vehicle. The instructions include instructions to communicate the trajectory information to the trailer to cause the trailer to follow a trajectory associated with the vehicle. The instructions include instructions to monitor whether the trailer is following the trajectory.

In one embodiment, a method is disclosed. In one embodiment, the method includes, responsive to determining that a physical connection between a vehicle and a trailer has disconnected, determining trajectory information for navigating the trailer without a connection to the vehicle. The method includes communicating the trajectory information to the trailer to cause the trailer to follow a trajectory associated with the vehicle. The method includes monitoring whether the trailer is following the trajectory.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
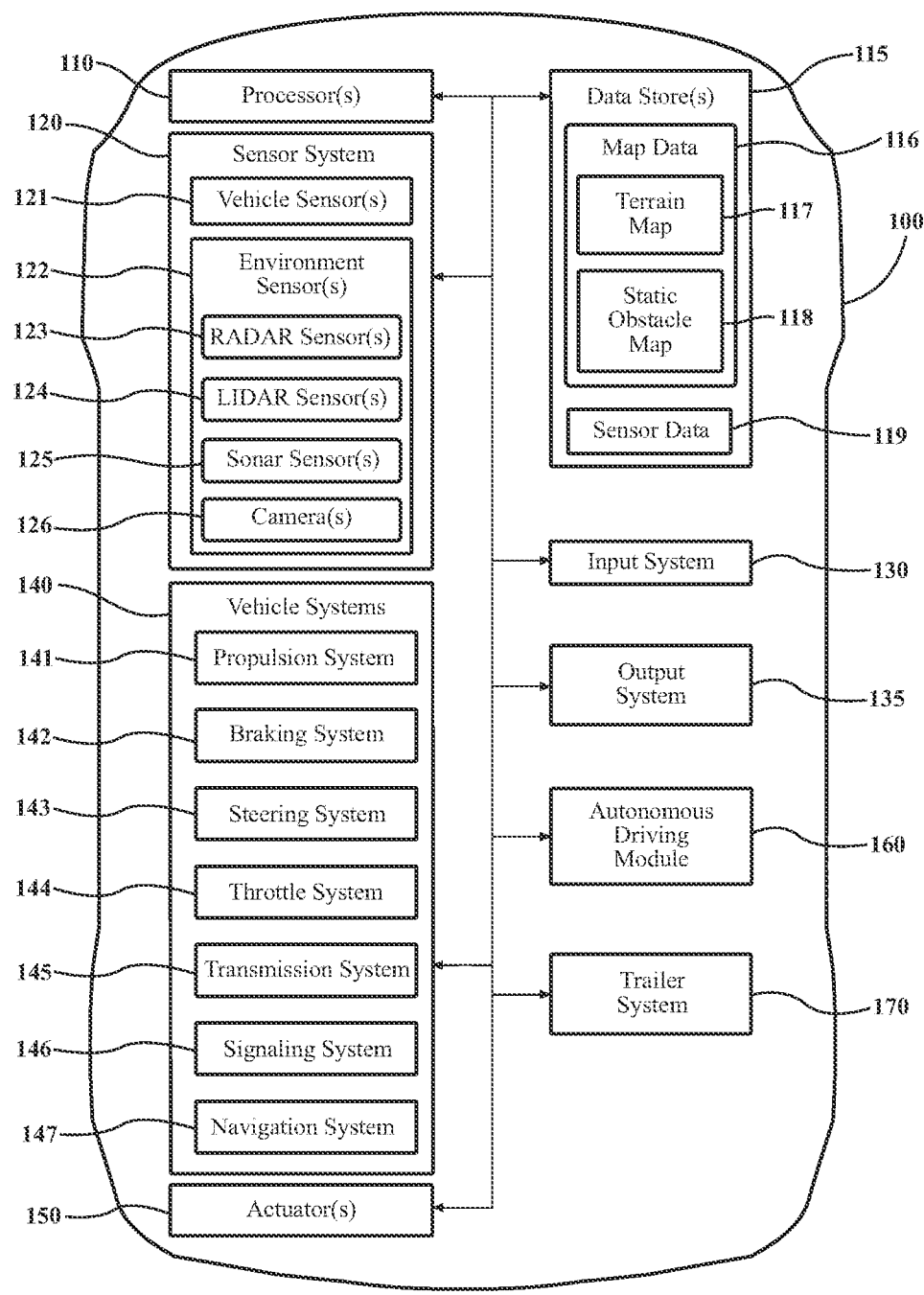
FIG. 1 illustrates one embodiment of a vehicle within which systems and methods disclosed herein may be implemented.

Systems, methods, and other embodiments associated with improving navigation of a trailer after a physical connection between a vehicle and the trailer disconnects are disclosed herein. As previously noted, a physical connection between a vehicle and a trailer disconnecting can result in uncontrolled trailer movements and sudden stops, potentially resulting in a collision.

Because a trailer moves in accordance with the vehicle to which it is connected, when a physical connection breaks, the trailer is not able to maneuver itself, thereby causing significant safety concerns. For example, if a physical connection breaks while the vehicle and the trailer are in motion, the trailer cannot receive any controls from the vehicle. Further, the trailer cannot receive braking controls to stop. Moreover, after the trailer disconnects from the vehicle, a driver must return to the trailer and physically reconnect the trailer to the vehicle to drive it off of the road and get it away from traffic.

Therefore, in one embodiment, a wireless towing system is disclosed that allows for a vehicle to continue navigating a trailer in the event of a physical connection between the vehicle and trailer disconnecting. In one approach, the vehicle automatically detects a disconnected physical connection using sensor information, such as a physical connection sensor, image recognition or navigation data associated with the current location of the trailer in relation to the vehicle. In one approach, a physical connection sensor detects whether the physical connection is present. In one embodiment, the vehicle may use sensors, such as a rear camera, to acquire image data of the trailer and the surroundings of the trailer. In one arrangement, the vehicle system uses the acqured image data to localize the trailer in a three-dimensional (3D) space by extracting visual features of the image data. The localization of the trailer may be accomplished through any conventional localization method, such as, using monocular depth estimation to derive 3D structures of static and dynamic objects in the surroundings of the trailer. The vehicle system, in one approach, uses the localization of the trailer to determine if the physical connection is present in the environment of the trailer. If the localization indicates that the physical connection is not present, the vehicle system determines that the physical connection has disconnected. In one approach, the vehicle system determines the physical connection has disconnected by comparing the image data to reference data. The reference data may include images of the trailer and the vehicle connected to one another.

In one embodiment, the vehicle determines that a physical connection has disconnected by using the 3D localization of the trailer to determine the trailer exceeds a threshold distance away from the vehicle. In one arrangement, the threshold distance is a defined distance the trailer may be located from the vehicle with a connected physical connection. In response to localizing the trailer, the vehicle system determines that the physical connection is present when the trailer satisfies the distance threshold. On the other hand, the vehicle system determines that the physical connection has disconnected if a derived location of the trailer exceeds the threshold distance from the vehicle.

In one approach, the trailer automatically activates a front mobility component such as, for example, a front wheel when the physical connection between the vehicle and trailer disconnects. Activating the front wheel may include dropping down the front wheel from a retracted position. In one arrangement, the front mobility component may include a plurality of front wheels to provide more stability. As such, the trailer can determine to deploy a specific number of front wheels and at which locations of the trailer to deploy the wheels based on factors, such as the weight of the load being hauled by the trailer, the dimensions of the trailer, the terrain the trailer is driving on, the weather, and the like to ensure the safest and most stable configuration to facilitate trailer movements. In one configuration, the mobility component is a gyroscope-based stabilizer. When the mobility component is a gyroscope-based stabilizer, the mobility component functions to balance the trailer on two rear wheels.

Because the direct physical connection is no longer present, the vehicle may initially establish a wireless communication link with the trailer or at least ensure an existing communication remains available. In one approach, the system uses a wireless communication link to send the trailer instructions since the physical connection is no longer present (i.e., the method that the vehicle may otherwise use to communicate with the trailer is no longer present).

In response to determining a wireless connection exists between the vehicle and trailer, the system identifies a trajectory associated with a future path of the vehicle. In one embodiment, the vehicle automatically generates and wirelessly communicates the trajectory associated with the path of the vehicle for the trailer to follow so that the trailer does not suddenly stop in the middle of traffic when it disconnects from the vehicle. In one approach, the trajectory associated with the path of the vehicle is automatically generated by calculating the trajectory information from operating characteristics of the vehicle as extrapolated into a future path. In one or more arrangements, calculating the trajectory information includes calculating a trajectory according to perceived obstacles and road conditions. In one configuration, the trailer receives the trajectory over the wireless communication link and follows the path of the vehicle. Communicating a trajectory to the trailer may also include communicating a desired speed for the trailer to follow, braking requests, steering requests, and a safe following distance for the trailer to maintain among other attributes. The controls ensure that the trailer is following behind the vehicle as if the physical connection is still present.

In one or more arrangements, if a wireless communication link cannot be established between the vehicle and trailer, the trailer executes fail-safe controls. In one embodiment, the fail-safe controls include acquiring sensor data about the surrounding environment of the trailer. If, based on the sensor data, the trailer system determines that a safe pull over is feasible, the trailer will autonomously pull over. If, however, the system determines that a safe pull over is not feasible, the trailer activates a contingency. Activating the contingency may include, for example, applying the brakes of the trailer, activating hazard lights, or the like.

The vehicle monitors whether the trailer is following the trajectory using sensors, such as cameras. In one approach, the vehicle acquires, for example, sensor data to determine if the trailer is following the trajectory by comparing the communicated trajectory with the real-time trajectory the trailer is following. In one or more arrangements, if the trailer is not following the communicated trajectory, the vehicle automatically sends a new trajectory for the trailer to follow to prevent unwanted events, such as a collision. In one embodiment, the new trajectory may be associated with following a second vehicle on the road. Following the second vehicle is a backup method that allows the trailer to continue traversing the road if, for some reason, the trailer is not establishing the appropriate connection necessary to follow the vehicle it was originally connected to. In this way, the vehicle maintains control over the trailer despite a disconnected physical connection until the vehicle commands the trailer to stop, thereby improving navigation of a trailer without the presence of a physical connection to a towing vehicle.

In one approach, when the vehicle reaches a safe area on the road where the vehicle and trailer can both safely pull over, the vehicle communicates a stop signal to the trailer. In one arrangement, a human machine interface (HMI) may receive an electronic input specifying a stop condition or the system automatically generates and sends the stop signal when the vehicle successfully pulls over and parks. The electronic input may be received by, for example, a human driver pressing a button or interacting with a touchscreen within the vehicle to send the stop signal to the trailer. In either case, the stop signal commands the trailer to pull over behind the vehicle to end wireless trailer manipulation. In this way, the trailer system improves operation of a vehicle with a trailer by automatically taking and maintaining control of the trailer when a physical connection between the vehicle and the trailer is lost. Further, a driver can reconnect the physical connection between the vehicle and trailer safely and away from traffic once the vehicle and trailer reach a safe stopping point.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any robotic device or form of motorized transport that, for example, tows a trailer. In one embodiment, the vehicle 100 includes a physical connection point (e.g., ball and hitch) to which a trailer may be attached for towing. In further aspects, the vehicle 100 also includes components that facilitate wireless communications between the vehicle 100 and trailer through which the vehicle 100 communicates a trajectory to cause trailer systems, such as signaling systems, braking systems, sensor systems, and so on to execute the trajectory. Accordingly, in various approaches, the vehicle 100 can control the noted systems of the trailer.

The vehicle 100 also includes various elements. It will be understood that, in various embodiments, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-7 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 includes a trailer system 170 that is implemented to perform methods and other functions as disclosed herein relating to improving trailer control after a physical connection between the trailer and vehicle disconnects.

Figure 2:
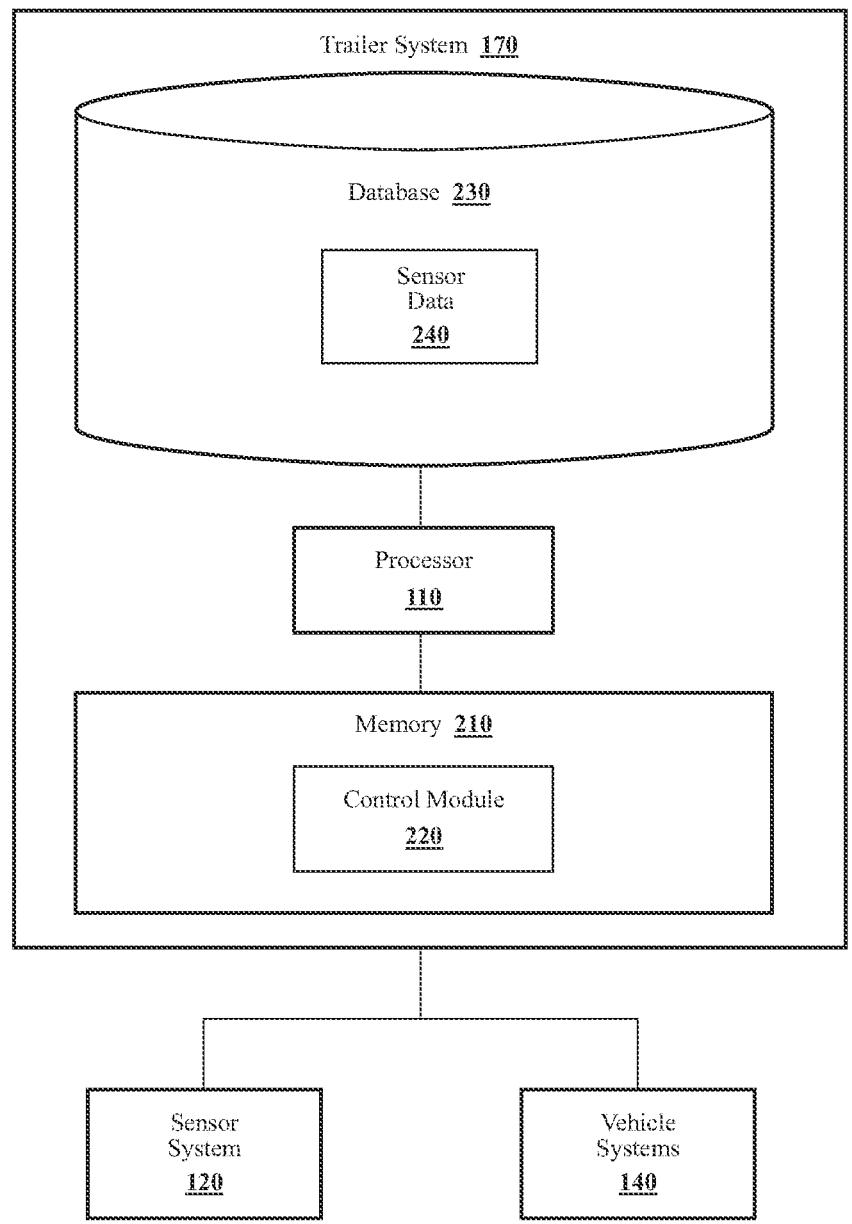
FIG. 2 illustrates one embodiment of a trailer system that is associated with improving navigation of a trailer after a physical connection between a vehicle and the trailer disconnects.

With reference to FIG. 2, one embodiment of the trailer system 170 of FIG. 1 is further illustrated. The trailer system 170 is shown as including a processor 110 from the vehicle 100 of FIG. 1. Accordingly, the processor 110 may be a part of the trailer system 170, the trailer system 170 may include a separate processor from the processor 110 of the vehicle 100, or the trailer system 170 may access the processor 110 through a data bus or another communication path. In one embodiment, the trailer system 170 includes a memory 210 that stores a control module 220. The memory 210 is a random-access memory (RAM), read-only memory (ROM), a hard-disk drive, a flash memory, or other suitable memory for storing the control module 220. The control module 220 is, for example, computer-readable instructions that when executed by the processor 110 cause the processor 110 to perform the various functions disclosed herein.

With reference to FIG. 2, the control module 220 generally includes instructions that function to control the processor 110 to receive data inputs from one or more sensors of the vehicle 100. The one or more sensors of the vehicle 100 may be located on exterior surfaces of the vehicle 100, such as to encompass an area about a trailer that is following the vehicle 100. For example, the one or more sensors may include rear-facing cameras that monitor the presence and state of a physical connection connecting the vehicle 100 and the trailer to detect whether the physical connection disconnects. In one or more arrangements, the one or more sensors may be configured to monitor the movements of a trailer to determine whether the trailer is following a requested trajectory. Still, in one or more embodiments, the one or more sensors may be configured to monitor an area encompassing 360 degrees surrounding the vehicle and the trailer to determine whether a safe pull over maneuver is feasible. The data inputs are, in one embodiment, observations of one or more objects in an environment proximate to the vehicle 100, a trailer, and/or other aspects about the surroundings. As provided for herein, the control module 220, in one embodiment, acquires sensor data 240 that includes at least camera images. In further arrangements, the control module 220 acquires the sensor data 240 from further sensors, such as a radar 123, a LiDAR 124, and other sensors as may be suitable for identifying vehicles and locations of the vehicles.

Accordingly, the control module 220, in one embodiment, controls the respective sensors to provide the data inputs in the form of the sensor data 240. Additionally, while the control module 220 is discussed as controlling the various sensors to provide the sensor data 240, in one or more embodiments, the control module 220 can employ other techniques to acquire the sensor data 240 that are either active or passive. For example, the control module 220 may passively sniff the sensor data 240 from a stream of electronic information provided by the various sensors to further components within the vehicle 100. Moreover, the control module 220 can undertake various approaches to fuse data from multiple sensors when providing the sensor data 240 and/or from sensor data acquired over a wireless communication link. Thus, the sensor data 240, in one embodiment, represents a combination of perceptions acquired from multiple sensors.

The sensor data 240 may include, for example, information about a trajectory of a trailer following the vehicle 100, and so on. Moreover, the control module 220, in one embodiment, controls the sensors to acquire the sensor data 240 about an area that encompasses 360 degrees about the vehicle 100 and a trailer following the vehicle 100 in order to provide a comprehensive assessment of the trajectory of the trailer and to provide guidance with respect to future maneuvers the trailer may execute. Of course, in alternative embodiments, the control module 220 may acquire the sensor data about a reverse direction alone when, for example, the vehicle 100 is not equipped with further sensors to include additional regions about the vehicle and/or the additional regions are not scanned due to other reasons.

Moreover, in one embodiment, the trailer system 170 includes a data store 230. In one embodiment, the data store 230 is a database. The database is, in one embodiment, an electronic data structure stored in the memory 210 or another data store and that is configured with routines that can be executed by the processor 110 for analyzing stored data, providing stored data, organizing stored data, and so on. Thus, in one embodiment, the data store 230 stores data used by the control module 220 in executing various functions. In one embodiment, the data store 230 further includes other information that is used by the control module 220. The discussion will now shift to FIG. 3 to further explain how the control module 220 implements various functions to control a trailer when the trailer becomes disconnected from the vehicle 100.

Figure 3:
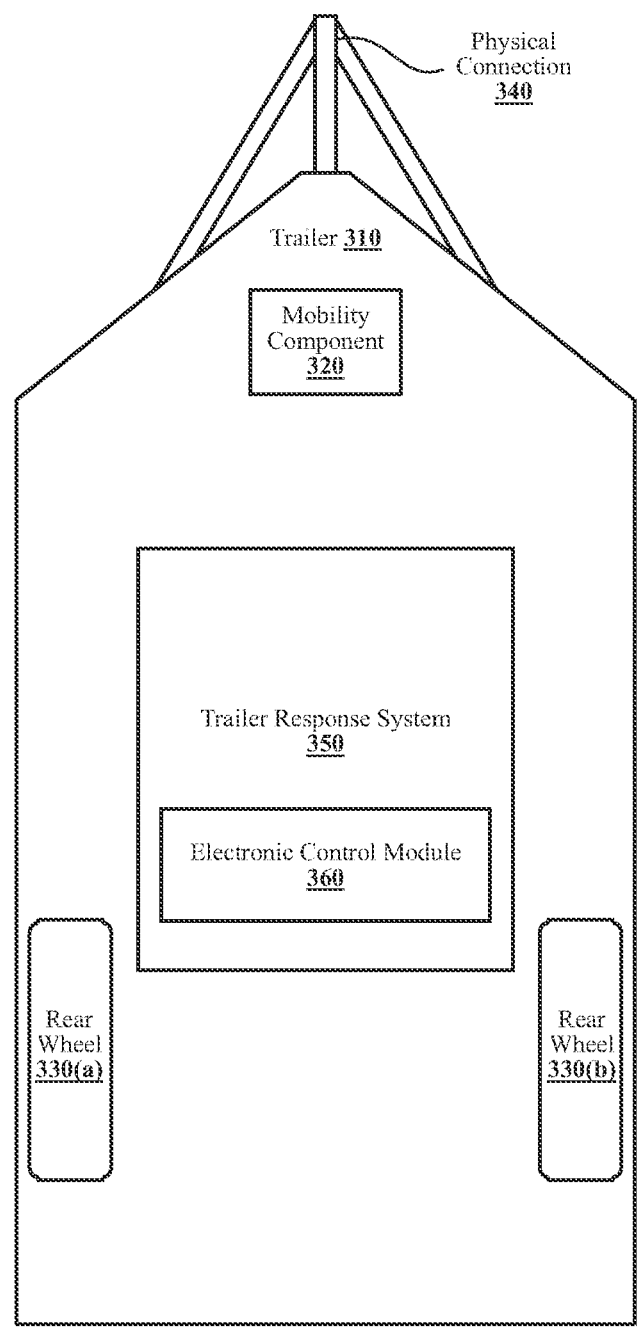
FIG. 3 illustrates one embodiment of a trailer within which systems and methods disclosed herein may be implemented.

With reference to FIG. 3, one embodiment of a trailer 310 is illustrated. As discussed herein, the trailer 310 includes at least two rear wheels 330(a) and 330(b) and is capable of connecting to a vehicle with a physical connection (e.g., a hitch) 340. Of course, while the present disclosure describes a particular configuration of the trailer 310, it should be appreciated that further forms (e.g., different arrangements of wheels, axles, etc.) remain within the spirit of the present approach. In one or more implementations, the trailer 310 has a mobility component 320. The mobility component 320 is, for example, a single wheel, a set of wheels, a gyroscope-based stabilizer, or another device capable of facilitating movement of the trailer 310 when disconnected from a towing vehicle. In one approach, the mobility component 320 drops down and extends beneath the trailer 310 when the physical connection 340 disconnects from the vehicle to facilitate continued mobility and navigation of the trailer 310 separately from the vehicle 100. In various arrangements, the trailer 310 includes a trailer response system 350 with a response module 360. The response module 360 generally functions to control the trailer 310, which may include executing instructions from the control module 220. In one embodiment, the trailer response system 350 also includes a sensor system. The sensor system may include sensors capable of capturing image data of the surroundings of the trailer 310 in addition to further sensors. Discussion will now transition back to FIG. 2 to further explain how the control module 220 functions to navigate the trailer 310.

With reference to FIG. 2, the control module 220, in one embodiment, is further configured to perform additional tasks beyond controlling the respective sensors to acquire and provide the sensor data 240. For example, the control module 220 includes instructions that cause the processor 110 to analyze the sensor data 240 to identify the presence of a physical connection 340 between the vehicle 100 and trailer 310. In one approach, the control module 220 determines that the physical connection 340 has disconnected by acquiring sensor data 240 from one or more sensors associated with the vehicle. In one arrangement, a physical connection sensor determines whether a physical connection is present. The physical connection sensor indicates that the physical connection 340 is no longer present if an electrical connection ceases to exist between the vehicle 100 and the trailer 310. As such, the control module 220 determines that the physical connection 340 has disconnected based on the sensor data 240 associated with the physical connection sensor.

In one or more arrangements, the sensor data 240 includes at least image data of the trailer. In one approach, the control module 220 localizes the trailer 310 in a three-dimensional (3D) space according to the acquired image data encompassing the trailer 310 and the surroundings of the trailer 310. The localization of the trailer may be accomplished through various localization methods, such as, using monocular depth estimation to derive 3D structures of static and dynamic objects in the surrounding environment of the trailer 310. Accordingly, in one embodiment, the control module 220 uses the localization of the trailer 310 to determine whether the physical connection 340 has disconnected. In one embodiment, the control module 220 determines the physical connection 340 has disconnected by comparing the image data to reference data. The reference data may include images of a vehicle and trailer physically connected to one another. If the acquired image data does not conform with the reference data, the control module 220 determines that the physical connection 340 is disconnected.

In one embodiment, the control module 220 determines the physical connection 340 has disconnected by using the localization of the trailer to determine whether the trailer 310 satisfies a threshold distance from the vehicle 100. In one arrangement, the threshold distance is a defined distance the trailer 310 may be located from the vehicle 100 with a connected physical connection 340. For example, the threshold distance may be defined as the length of the physical connection 340, which may include a tolerance. If the trailer 310 satisfies the threshold distance from the vehicle 100 (i.e., the trailer 310 is located at a distance corresponding to the length of the physical connection 340 from the vehicle 100), the control module 220 determines the physical connection 340 is present. Alternatively, if the trailer 310 exceeds the threshold distance (i.e., the localization indicates that the trailer 310 is farther away than the length of the physical connection 340 from the vehicle 100), the control module 220 determines the physical connection 340 is not present.

The control module 220 determines whether a wireless connection between the vehicle 100 and the trailer 310 exists. The control module 220 uses a wireless connection to communicate trajectory information from the vehicle 100 to the trailer 310. In one approach, the control module 220 determines whether an existing wireless connection exists between the vehicle 100 and the trailer 310 by identifying and testing an existing wireless connection. The control module 220 may test the wireless connection by sending a secured message over the wireless connection to the trailer 310. As such, the control module 220 determines that a wireless connection exists if the trailer 310 receives the secured message.

If a wireless connection does not exist between the vehicle 100 and the trailer 310, the control module 220 establishes a wireless connection between the vehicle 100 and the trailer 310. For example, the control module 220 may establish the wireless connection by using a handshake process. The handshake process includes the control module 220 identifying a beacon transmitted from the trailer 310 and subsequently sending a secured message receivable by the trailer 310.

If the control module 220 cannot establish a wireless connection between the vehicle 100 and the trailer 310, the control module 220 can monitor the trailer 310. The control module 220 monitors the trailer 310 by, in one approach, acquiring sensor data 240 and analyzing the sensor data 240 to determine the state of the trailer 310 (e.g., whether the trailer 310 is moving, whether the trailer 310 has activated the mobility component 320, whether the trailer 310 has activated contingencies, such as applying brakes or flashing hazard lights, etc.). The sensor data 240 includes at least information that the system may use to derive a location of the trailer 310.

If the control module 220 determines that a wireless connection does exist between the vehicle 100 and the trailer 310, the control module 220 activates the mobility component 320. Activating the mobility component 320 may include controlling systems of the trailer 310 to release the mobility component 320 from a retracted position to an extended position. In one configuration, when the mobility component 320 is a wheel, the wheel functions in accordance with the rear wheels 320(a) and 330(b) and steers the trailer 310. In one arrangement, when the mobility component 320 is a gyroscope-based stabilizer, the rear wheels 320(a) and 330(b), the gyroscope-based stabilizer balances the trailer 310 on the rear wheels 320(a) and 320(b). In one or more arrangements, the mobility component 320 may comprise a plurality of wheels located along the front undercarriage of the trailer 310. As such, the control module 220 determines a specific number of wheels and at which locations of the undercarriage of the trailer 310 to deploy the wheels based on factors, such as the weight of the load being hauled by the trailer, the dimensions of the trailer, the terrain the trailer is driving on, the weather, and the like to ensure stability and safe maneuvering of the trailer 310.

In response to successfully establishing a wireless connection between the vehicle 100 and the trailer 310 and ensuring safe mobility of the trailer 310 through activating the mobility component 320, the control module 220 determines trajectory information for navigating the trailer 310. In one embodiment, the control module 220 determines the trajectory information by calculating the trajectory information from operating characteristics of the vehicle 100 as extrapolated into a future path. In one embodiment, calculating the trajectory information from operating characteristics of the vehicle 100 as extrapolated into a future path includes determining a future path of the vehicle 100 based, at least in part on, perceived obstacles and road conditions. For example, the control module 220 may determine a trajectory the trailer 310 should follow based on an upcoming lane closure, a pedestrian in the road, or the like. Accordingly, the control module 220 communicates the trajectory to the trailer 310 which causes the trailer 310 to determine the appropriate maneuvers to take, including a following distance to maintain between the vehicle 100, the speed the trailer 310 should be maintaining, steering angles that need to be executed to follow the trajectory, and so on. In one approach, calculating the trajectory information from operating characteristics of the vehicle 100 as extrapolated into a future path includes receiving control inputs from the vehicle 100. In one arrangement, the control inputs include speed controls, braking controls, following distance controls, and steering controls. The control module 220 communicates, from the vehicle 100 to the trailer 310, the controls inputs to maneuver the trailer 310 accordingly.

In one or more arrangements, the control module 220 translates the control inputs into commands for controlling the trailer. That is, the control module 220 may identify an intent of the control inputs and translate the control inputs into commands that are interpretable by the trailer 310 for inducing movements therein. Moreover, the control module 220, in at least one approach, forms the communication using a particular protocol to encode the commands such that the communication between the system 170 and the trailer 310 are secure from malicious interference. For example, following distance controls may include a distance the trailer 310 must be from the vehicle 100. Accordingly, the trailer 310 follows the vehicle 100 with at least the following distance between the vehicle 100. The control module 220 may automatically update control inputs for the trailer 310 to execute as the vehicle 100 changes its path. For example, if the vehicle 100 suddenly stops, the control module 220 receives updated braking controls and communicates the controls to the trailer 310.

In one approach, the control inputs may be generated according to an electronic input from a machine interface controlled by a human driver. The machine interface may include buttons and a touch screen. For example, a human driver may manually input the following distance for the trailer 310 on a touchscreen within the vehicle 100. In any case, the control module 220 receives control inputs and communicates the control inputs to the trailer 310.

The control module 220 monitors whether the trailer 310 is following the trajectory. In one embodiment, the control module 220 monitors whether the trailer 310 is following the trajectory by comparing the trajectory information with a real-time trajectory the trailer 310 is following. The control module 220 acquires the real-time trajectory the trailer 310 is following by controlling the sensor system 120 to acquire sensor data 240 or by receiving communications from the trailer 310. In one approach, the sensor data 240 includes image data of the trailer 310 and the surroundings of the trailer 310. As previously discussed, the control module 220 may use the image data to localize the trailer 310 in a 3D space. Localizing the trailer 310 may include identifying locations of static and dynamic objects in the surrounding environment of the trailer 310. In one embodiment, the control module 220 determines the real-time trajectory of the trailer 310 by determining the 3D location of the trailer 310 as it moves along a path. The control module 220 may localize the trailer 310 with respect to the path of travel of the vehicle 100 to determine the path the trailer 310 is on. Accordingly, the control module 220 uses the localization of the trailer 310 to determine the real-time trajectory.

In one approach, the control module 220 can determine that the trailer 310 is not following the trajectory if, for example, the image data and subsequent 3D localization of the trailer 310 indicates that the trailer 310 is traveling along a path not associated with the trajectory of the vehicle 100 or if the 3D localization indicates that the trailer 310 is not moving at all. In one embodiment, the control module 220 determines that the trailer 310 is not following the trajectory if the wireless connection between the vehicle 100 and the trailer 310 is lost.

In any case, in response to determining the trailer 310 is not following the trajectory, the control module 220 determines and communicates following information associated with a second vehicle on the road. The control module 220 identifies the second vehicle based on the sensor data 240. In one embodiment, the sensor data 240 includes image and radar data, where the image and radar data include the dimensions of surrounding vehicles, the direction of travel of surrounding vehicles, the speed of surrounding vehicles, the locations of surrounding vehicles with respect to the trailer 310, and the like. In one arrangement, the control module 220 selects a second vehicle for the trailer 310 to follow if the second vehicle is traveling, for example, near the vehicle 100 or in the same direction as the vehicle 100 at a location close to the trailer 310. The following information causes the trailer 310 to follow a trajectory associated with the second vehicle. The control module 220 continues monitoring whether the trailer 310 is following the trajectory associated with the second vehicle by comparing the following information with a real-time trajectory the trailer 310 is following. As previously discussed, the control module 220 determines the real-time trajectory using the sensor data 240.

While the trailer 310 executes the trajectory, the control module 220 continues to acquire sensor data 240 about the surrounding environment of the vehicle 100 and the trailer 310 to determine when to stop navigating the trailer 310. Accordingly, the control module 220 determines whether to send a stop signal to the trailer 310 to stop navigating the trailer 310. In one embodiment, the control module 220 determines whether to send a stop signal to the trailer 310 as a function of the sensor data 240 about the surrounding environment of the vehicle 100. For example, if the sensor data 240 indicates that a safe pull over maneuver is feasible (i.e., if the vehicle 100 is driving near an empty shoulder of the road), and the trailer 310 is successfully following the trajectory of the vehicle 100, the control module 220 determines to send a stop signal to the trailer 310. If a safe pull over maneuver is not feasible, the control module 220 continues communicating trajectory information to the trailer 310.

In one approach, the stop signal is generated according to an electronic input from a machine interface controlled by a human driver. The machine interface may be, for example, a button or touchscreen device. In one embodiment, the human driver may press the button or touchscreen device. In response, the control module 220 sends the stop signal to the trailer 310.

In one arrangement, the control module 220 automatically generates the stop signal based, at least in part, on a maneuver of the vehicle 100 indicating an intention to stop navigating the trailer 310. For example, in one embodiment, the vehicle 100 begins to steer towards the shoulder of the road, which is indicative of a pull over maneuver. The act of pulling over is indicative of an intention to stop navigating the trailer 310, and therefore, the control module 220 automatically generates the stop signal when such a maneuver is detected. In another approach, the vehicle 100 may park on the side of the road. Parking the vehicle 100 is indicative of an intention to stop navigating the trailer 310, and therefore, the control module 220 automatically generates the stop signal when the vehicle 100 parks. In any case, when the control module 220 sends the stop signal to the trailer 310, the trailer 310 follows a trajectory to pull over behind the vehicle 100 and subsequently stops navigating after pulling over.

Figure 4:
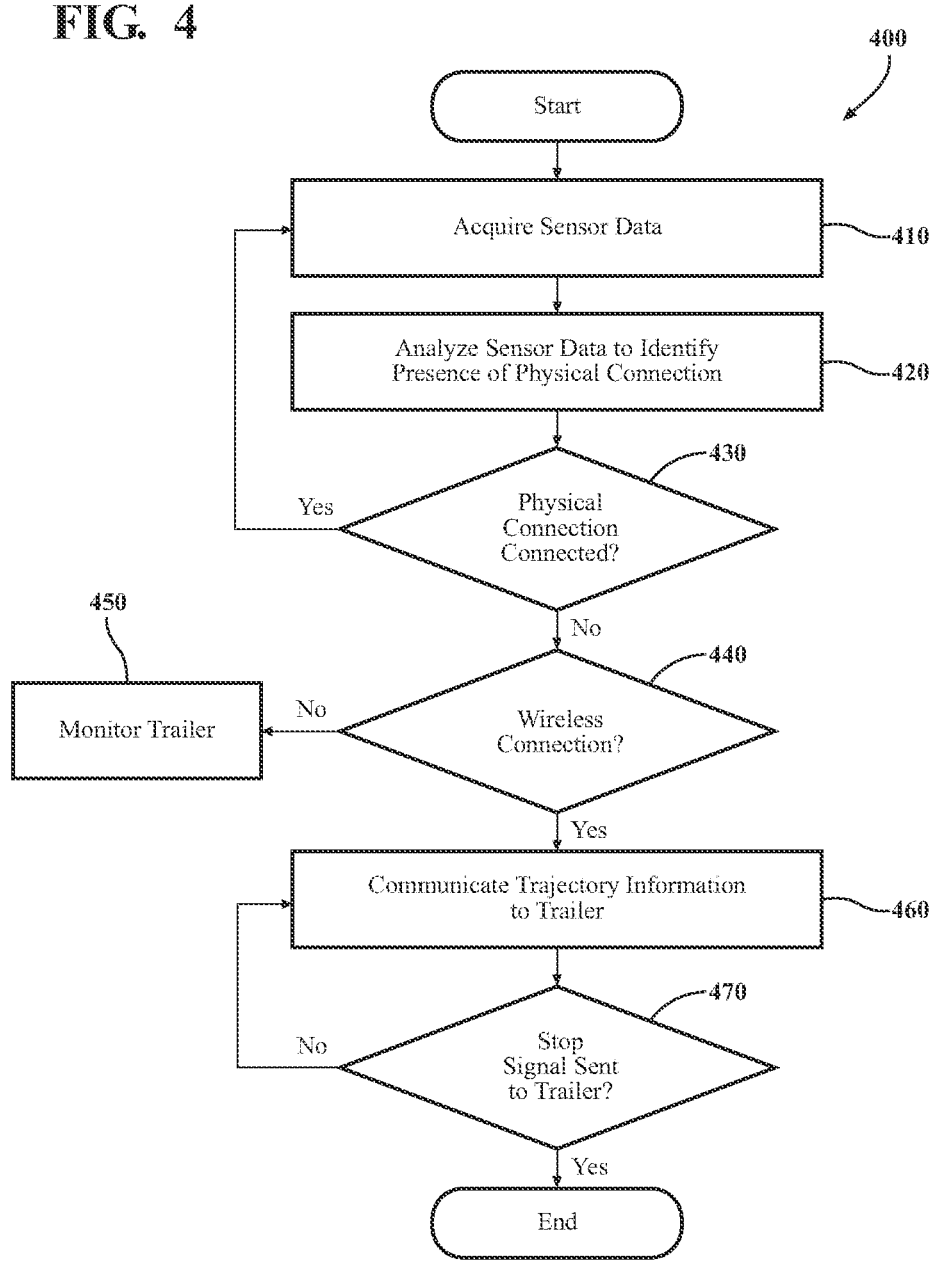
FIG. 4 is a flowchart illustrating one embodiment of a method associated with improving navigation of a trailer after a physical connection between a vehicle and the trailer disconnects.

Additional aspects of improving trailer control from within a vehicle after a physical connection between the vehicle and the trailer disconnects will be discussed in relation to FIG. 4. FIG. 4 illustrates a flowchart of a method 400 that is associated with monitoring the physical connection 340 and controlling the trailer 310 from the vehicle 100 after the physical connection 340 between the vehicle 100 and the trailer 310 disconnects. Method 400 will be discussed from the perspective of the trailer system 170 of FIGS. 1, and 2. While method 400 is discussed in combination with the trailer system 170, it should be appreciated that the method 400 is not limited to being implemented within the trailer system 170 but is instead one example of a system that may implement the method 400. Discussion of the method 400 may include discussion of FIG. 3 with respect to how the trailer 310 receives trajectory information from the trailer system 170 of FIGS. 1 and 2 after the physical connection 340 between the vehicle 100 and trailer 310 disconnects.

At 410, the control module 220 controls the sensor system 120 to acquire the sensor data 240. In one embodiment, the control module 220 controls the camera 126 of the vehicle 100 to observe the surrounding environment. Alternatively, or additionally, the control module 220 controls the camera 126, a plurality of cameras, a physical connection sensor, or another set of sensors to acquire the sensor data 240. As part of controlling the sensors to acquire the sensor data 240, it is generally understood that the sensors acquire the sensor data 240 of a region around the ego vehicle 100 with data acquired from different types of sensors generally overlapping in order to provide for a comprehensive sampling of the surrounding environment at each time step. The sensor data 240 of the region around the ego vehicle could include data related to occupants of the ego vehicle 150 or data related to the ego vehicle 150 itself. In general, the sensor data 240 need not be of the exact same bounded region in the surrounding environment but should include a sufficient area of overlap such that distinct aspects of the area can be correlated. Thus, the control module 220, in one configuration, controls the sensors to acquire the sensor data 240 of the surrounding environment.

Moreover, in further embodiments, the control module 220 controls the sensors to acquire the sensor data 240 at successive iterations or time steps. Thus, the trailer system 170, in one approach, iteratively executes the functions discussed at blocks 410-420 to acquire the sensor data 240 and provide information therefrom. Furthermore, the control module 220, in one arrangement, executes one or more of the noted functions in parallel for separate observations in order to maintain updated perceptions. Additionally, as previously noted, the control module 220, when acquiring data from multiple sensors, fuses the data together to form the sensor data 240 and to provide for improved determinations of detection, location, and so on.

At 420, the control module 220 analyzes the sensor data 240 to determine whether a physical connection 340 between the vehicle 100 and the trailer 310 has disconnected. In one approach, the control module 220 determines the physical connection 340 has disconnected by acquiring sensor data 240 from the physical connection sensor. In one or more arrangements, the physical connection sensor determines the physical connection 340 has disconnected when an electronic connection ceases to exist between the vehicle 100 and the trailer 310. In one embodiment, the control module 220 determines that the physical connection 340 has disconnected by acquiring sensor data 240 from one or more sensors associated with the vehicle, where the sensor data 240 includes at least image data of the trailer 310. In one arrangement, the control module 220 uses the image data encompassing the trailer 310 and the surroundings of the trailer 310 to localize the trailer 310 in a 3D space. Localizing the trailer 310 may include identifying static and dynamic objects in the surrounding environment of the trailer 310. As such, in one embodiment, the control module 220 determines the physical connection 340 has disconnected if the physical connection 340 is not present in the environment.

In one embodiment, the control module 220 determines, in response to localizing the trailer 310 in the 3D space, that the physical connection 340 is disconnected when the trailer 310 exceeds a threshold distance away from the vehicle 100. In one embodiment, the threshold distance is the defined distance the trailer 310 may be located from the vehicle 100 with a connected physical connection 340. In one arrangement, the control module 220 determines that the physical connection 340 between the vehicle 100 and the trailer 310 is present when the trailer 310 satisfies the threshold distance away from the vehicle 100. In another approach, the control module 220 determines the physical connection 340 has disconnected if the trailer 310 exceeds the threshold distance away from the vehicle 100. For example, if the trailer 310 is farther away from the vehicle 100 than the threshold distance, the control module 220 determines that the physical connection 340 has disconnected.

In one approach, the control module 220 determines the physical connection 340 has disconnected by comparing the image data to reference data to determine the physical connection 340 has disconnected. The reference data may be stored in the database and include images of an intact physical connection 340, images of the vehicle 100 and trailer 310 physically connected to one another, and the like. If the acquired image data does not conform with the reference data (i.e., if the image data does not show the physical connection 340 intact or if the image data does not show the vehicle 100 and the trailer 310 physically connected to one another), the control module 220 determines that the physical connection 340 has disconnected At 430, if the control module 220 determines that the physical connection 340 is present, the control module 220 continues monitoring the physical connection 340 as discussed at block 420. Otherwise, the control module 220 determines whether a wireless connection exists between the vehicle 100 and the trailer 310 as discussed at block 440.

At 440, the control module 220 determines whether a wireless connection between the vehicle 100 and the trailer 310 exists to communicate trajectory information from the vehicle 100 to the trailer 310. In one approach, the control module 220 identifies and tests an existing wireless connection between the vehicle 100 and the trailer 310. In one embodiment, the control module 220 tests the wireless connection by sending a secured message over the wireless connection from the vehicle 100 to the trailer 310. If the trailer 310 receives the secured message, the control module 220 determines that a wireless connection exists. If, on the other hand, the trailer 310 does not receive the secured message, the control module 220 determines that a wireless connection capable of sending trajectory information to the trailer 310 does not exist and proceeds to establish a wireless connection between the vehicle 100 and the trailer 310. In one arrangement, the control module 220 establishes a wireless connection between the vehicle 100 and the trailer 310 using a handshake process. In one approach, the handshake process begins with the trailer 310 transmitting a beacon. The control module 220 identifies the beacon transmitted by the trailer 310 and sends a secured message receivable by the trailer 310. A wireless connection is formed when the trailer 310 receives the secured message from the control module 220. If the control module 220 cannot successfully establish a wireless connection with the trailer 310 (i.e., the trailer cannot wirelessly receive secured messages transmitted from the control module 220), the control module 220 monitors the trailer 310 as discussed at block 450. If the control module 220 determines that a wireless connection does exist between the vehicle 100 and the trailer 310, the control module 220 determines trajectory information for navigating the trailer 310 as discussed at block 460.

If a wireless connection is established between the vehicle 100 and the trailer 310, the control module 220, in one approach, activates the mobility component 320 of the trailer 310. The mobility component 320 may be a structure that facilitates movement of the trailer 310, such as a wheel or gyroscope-based stabilizer. In one embodiment, the mobility component 320 comprises a plurality of wheels located on the undercarriage of the front portion of the trailer 310. In one arrangement, activating the mobility component 320 includes deploying the mobility component 320 from a retracted position to an extended position. In one configuration, the control module 220 determines how many wheels of the mobility component 320 to deploy based, at least in part, on factors, such as the weight of the load being hauled by the trailer 310, the dimensions of the trailer 310, the terrain the trailer 310 is driving on, the weather, and so on to ensure a stable and safe configuration of the trailer 310. For example, a trailer hauling a heavier load may require more front wheels of the mobility component 320 to be deployed than a trailer hauling a lesser load. In any case, the control module 220 activates the mobility component 320 to ensure the trailer 310 continues moving after the physical connection 340 disconnects.

At 450, in response to the control module 220 failing to establish a wireless connection between the vehicle 100 and the trailer 310, the control module 220 monitors the trailer 310. In one configuration, the control module 220 monitors the trailer 310 by controlling the sensor system 120 to acquire sensor data 240 about the trailer 310 and analyzing the sensor data 240. In one embodiment, the sensor data 240 includes image data about the trailer 310. In one configuration, the control module 220 uses the image data to determine the state of the trailer 310 (e.g., whether the trailer 310 is moving, whether the trailer 310 has activated the mobility component 320, whether the trailer 310 is damaged, whether the trailer 310 has activated contingencies, such as applying brakes or flashing hazard lights, etc.). In one embodiment, the control module 220 monitors the trailer 310 by analyzing the sensor data 240 to determine a relative location of the trailer 310 with respect to the vehicle 100.

At 460, the control module 220 determines trajectory information for navigating the trailer 310 without a physical connection to the vehicle 100. In one embodiment, the control module 220 determines trajectory information by calculating the trajectory information from operating characteristics of the vehicle 100 as extrapolated into a future path by determining a future path of the vehicle 100 based, at least in part on, perceived obstacles and road conditions. For example, the control module 220 may determine a path the trailer 310 should follow based on an upcoming lane closure, an upcoming construction zone, an upcoming car accident, a pedestrian in the road, icy roads, or the like.

In one approach, calculating the trajectory information from operating characteristics of the vehicle 100 as extrapolated into a future path includes determining dynamics of the vehicle 100. In one embodiment, the dynamics of the vehicle 100 include the speed of the vehicle 100, the steering maneuvers of the vehicle 100, and so on. As such, the control module 220 determines speed controls, braking controls, following distance controls, and steering controls to maneuver the trailer 310 according to the dynamics of the vehicle 100. In one or more arrangements, the control module 220 translates the controls into commands for controlling the trailer. That is, the control module 220 may identify an intent of the controls and translate the controls into commands that are interpretable by the trailer 310 for inducing movements therein. Moreover, the control module 220, in at least one approach, forms the communication using a particular protocol to encode the commands such that the communication between the system 170 and the trailer 310 are secure from malicious interference.

For example, speed controls may include speeds the trailer 310 must maintain along a trajectory. The speed controls, in one embodiment, may be determined based on the legal speed limits associated with a path the trailer 310 is traversing, the weight of the load the trailer 310 is hauling, the dimensions of the trailer 310, the terrain of the path the trailer 310 is traversing, and the like. Following distance controls may include a minimum distance the trailer 310 must keep between the vehicle 100 to ensure the trailer 310 can safely decelerate and stop behind the vehicle 100 when necessary. Accordingly, the trailer 310 follows the vehicle 100 with at least the following distance between the vehicle 100. The control module 220 may automatically update control inputs for the trailer 310 to execute as the vehicle 100 changes a path and as the environment changes. For example, if the vehicle 100 suddenly stops, the control module 220 receives updated braking controls that are communicated to the trailer 310. In one embodiment, the vehicle 100 may enter a path with inclement weather, such as icy roads. As such, the control module 220 receives updated following distance controls, where the updated following distance controls include a larger following distance the trailer 310 must maintain to traverse the path safely, which are communicated to the trailer 310.

In one configuration, the control inputs may be generated according to an electronic input from a machine interface controlled by a human driver. The machine interface may include a button, a dial, a touch screen, and so on. In one embodiment, the control module 220 generates control inputs when a human driver manually inputs the following distance for the trailer 310 to maintain and the speed the trailer 310 maintains on a touchscreen located within the vehicle 100. In one arrangement, the control module 220 generates control inputs when a human driver manually adjusts the following distance and speed the trailer 310 maintains using buttons or dials located within the vehicle 100. In any case, in response to determining the trajectory information, the control module 220 communicates the trajectory information to the trailer 310 to cause the trailer 310 to follow a trajectory associated with the vehicle 100.

At 470, the control module 220 monitors whether the trailer 310 is following the trajectory, where monitoring whether the trailer 310 is following the trajectory includes comparing the trajectory information with a real-time trajectory the trailer 310 is following. The control module 220 acquires the real-time trajectory the trailer 310 is following by acquiring sensor data 240 or by receiving communications from the trailer 310. In one approach, the sensor data 240 includes image data of the trailer 310 and the surroundings of the trailer 310. As previously discussed, the control module 220 may use the image data to localize the trailer 310 in a 3D space and to identify static and dynamic objects in the surrounding environment of the trailer 310. In one embodiment, the control module 220 determines the real-time trajectory of the trailer 310 by determining the 3D location of the trailer 310 as it moves along a path. The control module 220 determines the trailer 310 is not following the trajectory associated with the vehicle 100 if the 3D localization of the trailer 310 indicates the real-time trajectory of the trailer does not correspond to the trajectory associated with the vehicle 100. In one arrangement, the control module 220 uses the 3D localization of the trailer 310 to determine what path the trailer 310 is traveling on. If the trailer 310 is traveling on a path that does not correspond to the trajectory associated with the vehicle 100, the control module 220 determines that the trailer 310 is not following the trajectory associated with the vehicle 100.

In one arrangement, the trailer 310 communicates with the vehicle 100 over the wireless connection to communicate a real-time trajectory to the control module 220. For example, control module 220 may receive messages from the trailer 310 indicating an affirmative response after receiving control inputs. Accordingly, if the control module 220 does not receive a response from the trailer 310 after communicating trajectory information to the trailer 310, the control module 220 determines that the trailer 310 is not following the trajectory. In one approach, the control module 220 determines that the trailer 310 cannot follow the trajectory of the vehicle 100 because other vehicles, structures, devices, or the like are interfering with the ability of the trailer 310 to receive wireless trajectory communications from the vehicle 100. For example, other vehicles on the road may become positioned between the vehicle 100 and the trailer 310, thereby interfering with the wireless connection between the vehicle 100 and the trailer 310, which may cause the trailer 310 to not receive the trajectory information necessary to follow the path of the vehicle 100.

Responsive to the control module 220 determining that the trailer 310 is not following the trajectory associated with the vehicle 100, the control module 220 communicates following information for navigating the trailer 310 associated with a second vehicle, where the following information causes the trailer 310 to follow a trajectory associated with the second vehicle. In one embodiment, the control module 220 may identify a second vehicle by controlling the sensor system 120 to acquire sensor data 240 about the surrounding environment of the vehicle 100 and the trailer 310. The sensor data 240 may include, for example, image data and radar data. The image data and radar data inform the control module 220 about surrounding vehicles in the environment of the trailer 310 and the vehicle 100. The control module 220 may also identify characteristics associated with surrounding vehicles, such as the direction of travel of the surrounding vehicles, the speed of the surrounding vehicles, the dimensions of the surrounding vehicles, and the like. The control module 220 selects a second vehicle for the trailer 310 to follow based, at least in part on, the proximity of the second vehicle to the trailer 310 and the direction of travel of the second vehicle. The second vehicle may be traveling, for example, near the trailer 310 or in the same direction as the vehicle 100.

The control module 220 determines following information associated with the second vehicle by, in one embodiment, calculating the following information from operating characteristics of the second vehicle as extrapolated into a future path. In one configuration, the control module 220 calculates the following information by predicting future maneuvers of the second vehicle based on observations about the second vehicle acquired as the sensor data 240. For example, the sensor data 240 may include image data and radar data associated with the second vehicle and the surrounding environment of the vehicle 100. The vehicle 100 may be traveling on a 3-lane highway alongside the second vehicle. The control module 220 may determine that the second vehicle is likely to continue traveling forward on the highway, if, for example, the second vehicle is in the far-left lane or center lane. If the second vehicle is not in the far-right lane, it is unlikely that the second vehicle will exit the highway as the right lanes are typically where exits are present. If the vehicle 100 also does not intend on exiting, following the second vehicle is desirable. As such, the control module 220 may calculate following information associated with the second vehicle for the trailer 310 to follow. In one arrangement, the following information includes a following distance the trailer 310 must maintain between the second vehicle, a speed the trailer 310 maintain to successfully follow the second vehicle, and the like. The following information causes the trailer 310 to follow a trajectory associated with the second vehicle.

In one arrangement, the control module 220 may attempt to establish a wireless communication with the second vehicle to determine following information associated with the second vehicle. For example, the control module 220 may attempt to establish a wireless communication with the second vehicle using a handshake process. If a wireless communication is successfully established, the control module 220 requests the following information from the second vehicle, such as a path the second vehicle is likely to continue on, the speed of the second vehicle, and the like. Accordingly, the control module 220 sends the acquired following distance information to the trailer 310 to cause the trailer 310 to follow the path associated with the second vehicle. Alternatively, the control module 220 can instruct the trailer 310 to establish a wireless connection with the second vehicle so that the trailer 310 can acquire the following information directly from the second vehicle. In any case, the control module 220 continues to monitor whether the trailer 310 is following the trajectory associated with the second vehicle by comparing the following information with a real-time trajectory the trailer 310 is following. As previously discussed, the control module 220 determines the real-time trajectory based on the sensor data 240, where the sensor data 240 may include image data.

At 470, the control module 220 determines whether to send a stop signal to the trailer 310 to stop navigating the trailer 310. In one approach, the control module 220 determines to send a stop signal to the trailer 310 if a safe pull over maneuver is feasible. The control module 220 may determine that a safe pull over maneuver is feasible as a function of sensor data 240 about the surrounding environment of the vehicle 100. For example, the sensor data 240 may include image data and radar data about the surrounding environment of the vehicle 100. As such, in one embodiment, the control module 220 determines that a safe pull over maneuver is feasible if the image data and radar data indicates that an empty shoulder of the road the vehicle 100 is driving on is nearby and accessible. Accordingly, if a safe pull over maneuver is feasible, the control module 220 may send a stop signal to the trailer 310 to stop navigating the trailer 310. In one approach, the control module 220 determines that a safe pull over maneuver is not feasible if the image data and radar data indicates that no shoulder exists on the road the vehicle 100 is driving on, if the shoulder of the road is closed, or if the shoulder of the road is occupied by other vehicles, pedestrians, infrastructure or the like. If a safe pull over maneuver is not possible, the control module 220 continues determining and communicating trajectory information for the trailer 310 to follow as discussed at block 460. Otherwise, the control module 220 sends the stop signal to the trailer 310 to stop navigating the trailer 310.

In one configuration, the control module 220 generates the stop signal according to an electronic input from a machine interface controlled by a human driver. The machine interface may be, for example, a button or touchscreen device. In one embodiment, the touchscreen device may include a virtual "stop navigation" button which, when engaged by a human driver causes the control module 220 to send a stop signal to the trailer 310. In one configuration, the vehicle 100 may include a physical "stop navigating" button within the cabin of the vehicle 100. Accordingly, if a human driver presses the "stop navigating" button, the control module 220 sends the stop signal to the trailer 310.

In one arrangement, the control module 220 automatically generates the stop signal based, at least in part, on the vehicle 100 satisfying stopping criteria. The control module 220, in one embodiment, determines whether the stopping criteria is satisfied based, at least in part on, maneuvers of the vehicle indicating an intention of the vehicle 100 to park. For example, in one approach, the control module 220 determines that the parking criteria is satisfied when the vehicle 100 begins to steer towards the shoulder of the road and activates a turn signal or hazard lights. As such, the control module 220 generates the stop signal when such a maneuver is detected. In another embodiment, control module 220 determines that the parking criteria is satisfied when the vehicle 100 parks on the side of the road. Accordingly, the control module 220 automatically generates the stop signal when the vehicle 100 parks. In any case, when the control module 220 sends the stop signal to the trailer 310, the trailer 310 follows a trajectory associated with pulling over behind the vehicle 100 and subsequently stops navigating after pulling over by activating brakes and parking.

Figure 5:
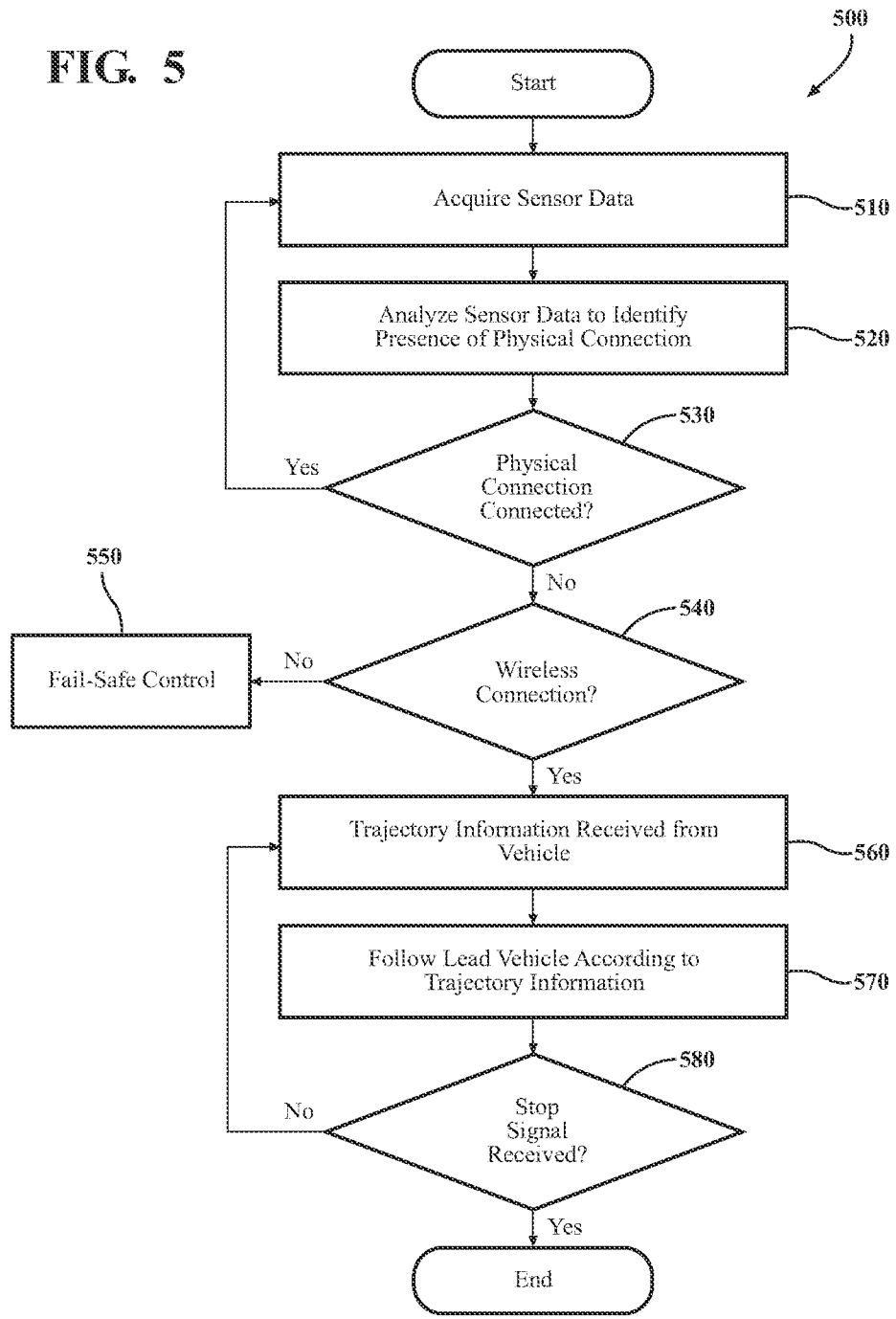
FIG. 5 is a flowchart illustrating one embodiment of a method associated with a trailer navigating separately from a vehicle based on received trajectory information.

FIG. 5 illustrates a flowchart of a method 500 that is associated with executing trajectory information received from the vehicle 100. The method 500 will be discussed from the perspective of the trailer response system 350 of FIG. 3 as it responds to trajectory information communicated from the trailer system 170 of FIGS. 1 and 2.

At 510, the response module 360 controls the sensor system of the trailer 310 to acquire sensor data. The sensor system of the trailer 310 may include at least one camera sensor. In one embodiment, the response module 360 controls the camera sensors of the trailer 310 to observe the surrounding environment. As part of controlling the sensors to acquire the sensor data, it is generally understood that the camera sensors acquire the sensor data of a region around the trailer 310. The sensor data of the region around the trailer 310 could include data related to the presence of a physical connection 340 connected to the trailer 310 and data related to the presence of vehicles surrounding the trailer 310. Thus, the response module 360, in one embodiment, controls the sensors to acquire the sensor data of the surrounding environment.

At 520, the response module 360 analyzes the sensor data to identify the presence of a physical connection 340 between the vehicle 100 and the trailer 310. In one approach, the response module 360 determines whether the physical connection 340 has disconnected by acquiring sensor data from one or more sensors associated with the trailer 310. The sensor data includes image data of the trailer 310 and image data of the physical connection 340. In one arrangement, the response module 360 uses the image data to localize the trailer 310 in a 3D space. Localizing the trailer 310 may include identifying static and dynamic objects in the surrounding environment of the trailer 310. As such, in one embodiment, the control module 220 determines the physical connection 340 has disconnected if the physical connection 340 is not present in the environment. In one arrangement, the response module 360 determines the physical connection 340 has disconnected by analyzing the image data. If the acquired image data does not show the physical connection 340 connecting the trailer 310 to the vehicle 100, the response module 360 determines that the physical connection 340 has disconnected.

At 530, if the response module 360 determines that the physical connection 340 is present, the response module 360 continues to analyze the sensor data to identify the presence of the presence of the physical connection 340 connecting the trailer 310 to the vehicle 100 as discussed at block 520. Otherwise, the response module 360 determines whether a wireless connection between the vehicle 100 and the trailer 310 is present as discussed at block 540.

At 540, the response module 360 determines whether a wireless connection between the vehicle 100 and the trailer 310 exists. A wireless connection is necessary to receive trajectory information from the vehicle 100. In one embodiment, the response module 360 determines that a wireless connection does not exist between the vehicle 100 and the trailer 310. If a wireless connection exists, the response module 360 receives trajectory information to cause the trailer 310 to follow the trajectory of the vehicle 100 as discussed at block 560. Otherwise, the response module 360 implements fail-safe controls as discussed in further detail at block 550 and in FIG. 6.

At 560, the response module 360 receives trajectory information from the control module 220. In one approach, the response module 360 determines a following distance to maintain between the vehicle 100, speeds to maintain, and steering maneuvers that may be executed to follow the trajectory. In one arrangement, the trajectory information includes speed controls, braking controls, following distance controls, and steering controls.

At 570, the response module 360 causes the trailer 310 to follow the vehicle 100 according to the trajectory information. For example, following distance controls may include a minimum distance the trailer 310 keep between the vehicle 100. Accordingly, the response module 360 causes the trailer 310 to follow the vehicle 100 at the following distance. The speed controls may include a speed for the trailer 310 to maintain as it traverses a path. As such, the response module 360 causes the trailer 310 to maneuver at the speed associated with the trajectory information. The steering controls may include instructions for the trailer 310 to turn at an intersection, follow the curvature of a path, and so on. Accordingly, the response module 360 causes the trailer 310 to execute turns and steering angles associated with the trajectory information. The control inputs update as the vehicle 100 changes its path. For example, if the vehicle 100 suddenly stops, the trajectory information updates, and the response module 360 receives updated braking controls to cause the trailer 310 to brake accordingly.

At 580, the response module 360 determines if a stop signal has been received from the control module 220. If the response module 360 determines that a stop signal is not received, the the response module 360 continues to receive and causes the trailer 310 to follow trajectory information as discussed at block 560. Otherwise, the response module 360 causes the trailer 310 to follow a trajectory to pull over behind the vehicle 100 and subsequently stops receiving trajectory information from the control module 220. When the trailer 310 pulls over, in one approach, the response module 360 activates the brakes of the trailer 310 to prevent the trailer 310 from moving.

Figure 6:
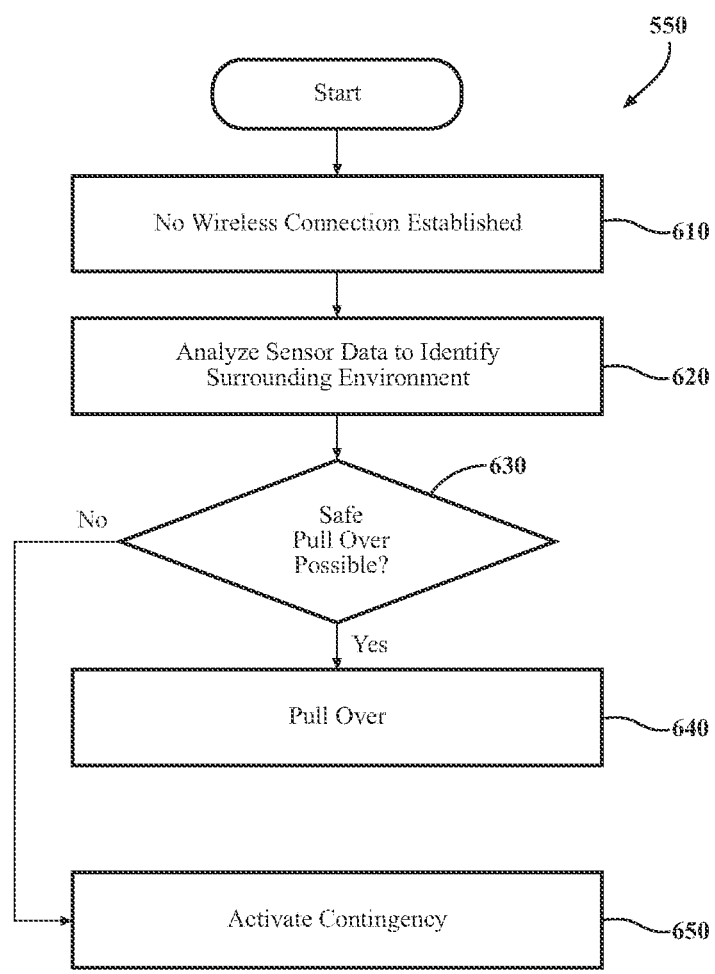
FIG. 6 is a flowchart illustrating one embodiment of a method associated with a fail-safe for when both a physical connection and wireless connection cannot be established between a vehicle and trailer.

FIG. 6 illustrates a flowchart of a method 550 that is associated with the response module 360 implementing a fail-safe control 550. The method 550 will be discussed from the perspective of the trailer response system 350 of FIG. 3.

At 610, the response module 360 determines that no wireless connection exists between the trailer 310 and the vehicle 100. As such, the response module 360 receives no communications from the control module 220. Since no wireless connection is available, the response module 360 causes the mobility component 320 of the trailer 310 to activate. The mobility component 320 is, for example, a wheel, a gyroscope-based stabilizer, or another device capable of facilitating movement of the trailer 310. In one configuration, the mobility component 320 comprises a plurality of wheels located on the front undercarriage of the trailer 310. Activating the mobility component 320 include releasing a plurality of wheels from a retracted position to an extended position. The response module 360 determines to release a specific number of front wheels at specific locations of the undercarriage of the trailer 310 based on factors, such as the weight of the load the trailer 310 is hauling, the dimensions of the trailer 310, the terrain the trailer 310 is driving on, the weather, and so on, to ensure a stable and safe travel configuration for the trailer 310.

At 620, the response module 360 analyzes the sensor data acquired from the sensor system of the trailer response system 350 to observe the surrounding environment of the trailer 310. In one arrangement, the surrounding environment includes the presence of approaching vehicles, attributes of the approaching vehicles (e.g., size, type, lateral lane offset, distance, etc.), the presence of static structures (e.g., roadside barriers, tunnels, buildings, etc.), weather conditions, and so on. As a general matter, the response module 360 analyzes the images from the sensor data to characterize aspects of the environment that can result in a collision if the trailer 310 attempts to independently pull over.

At 630, the response module 360 determines if a safe pull over maneuver is feasible for the trailer 310. In one approach, a safe pull over maneuver is feasible where a clear path exists between the trailer 310 and the shoulder of the road the trailer 310 is traveling on. For example, a clear path can be a path with no approaching vehicles or static structures between the trailer 310 and the shoulder of the road. In one embodiment, the response module 360 analyzes the sensor data to determine if a road shoulder exists at a particular location. If a road shoulder is not available, a safe pull over is not executable by the trailer 310. If the response module 360 determines that a safe pull over is not executable, the response module 360 continues to monitor for a safe pull over opportunity, as discussed at block 630. Otherwise, the response module 360 causes the trailer 310 to pull over, as discussed at block 640.

At 640, the response module 360 causes the trailer 310 to pull over on the side of the road. When the response module 360 determines that a safe pull over maneuver is feasible, the response module 360 may activate a turn signal of the trailer 310 to indicate the direction the trailer 310 intends on moving to pull over. In this way, the response module 360 moves the trailer 310 away from traffic until a driver of the vehicle 100 can reconnect to the trailer 310.

At 650, the response module 360 activates a contingency. Activating the contingency may include at least one of the following: activating the brakes of the trailer 310, flashing the hazard lights of the trailer 310, and attempting to establish a wireless connection between the trailer 310 and a second vehicle on the road. The trailer 310 may attempt to establish a wireless connection with a second vehicle on the road using, for example, a handshake process. The handshake process includes identifying a beacon transmitted from a second vehicle. The response module 360 recognizes the beacon and attempts to establish a connection to the second vehicle by sending a secure message to the second vehicle. A wireless connection is successfully established when the second vehicle receives the secure message from the response module 360. In this way, the trailer 310 does not lose control when the trailer 310 cannot receive any wireless instructions from the vehicle 100.

Figure 7:
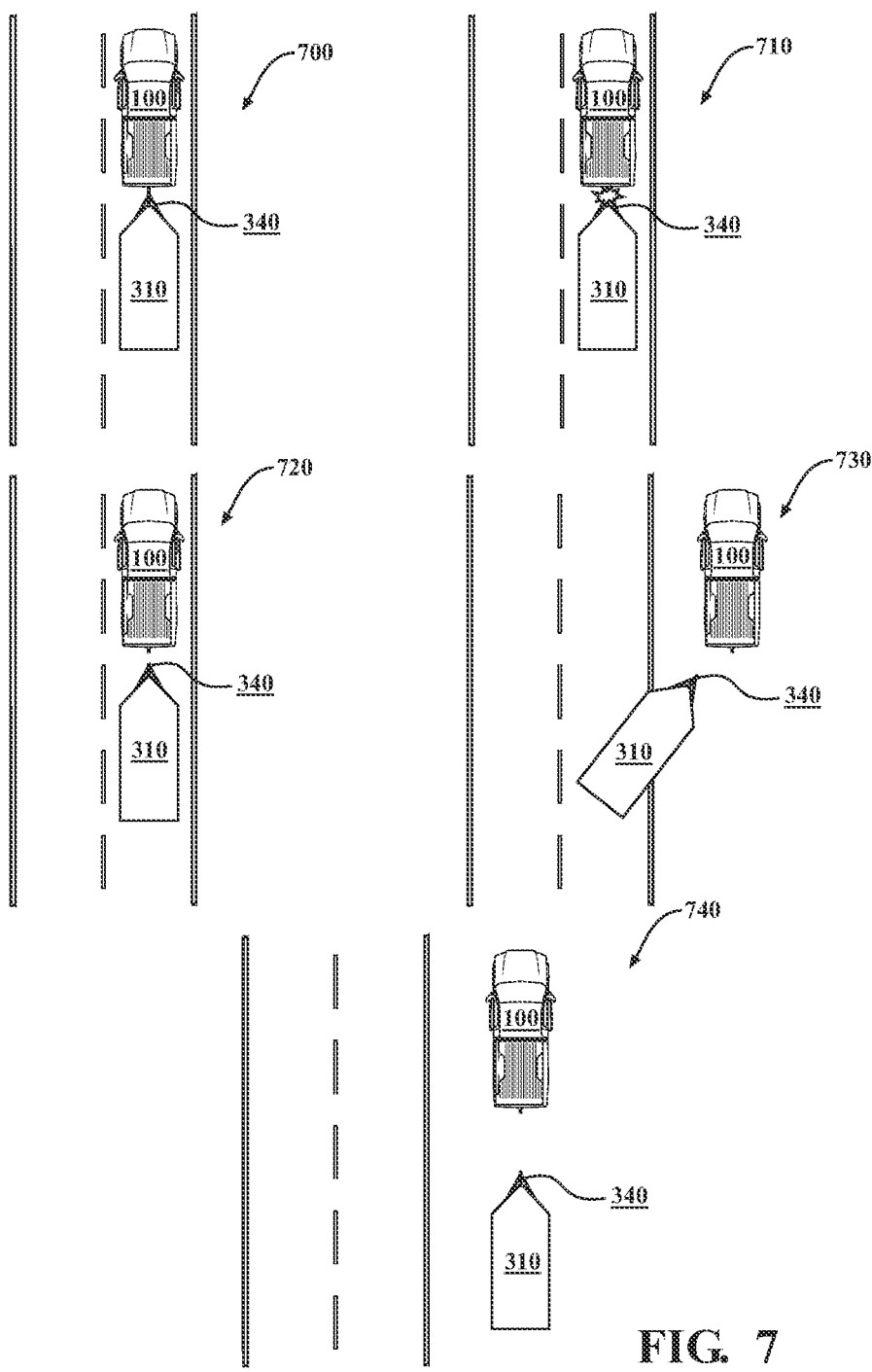
FIG. 7 illustrates a example sequence of a trailer disconnecting from a vehicle and subsequently receiving trajectory information to follow.

A further explanation of how the trailer system 170 improves navigating the trailer 310 when the physical connection 340 between the vehicle 100 and the trailer 310 is lost will now be discussed in relation to FIG. 7. At timestep, 700, FIG. 7 illustrates the vehicle 100 and the trailer 100 driving on a road connected together via the physical connection 340. FIG. 7 illustrates, at timestep 710, the physical connection 340 breaking or becoming disconnected. The disconnection may occur, for example, as a result of environmental factors (e.g., inclement weather, such as wind, etc.), rough driving terrain (e.g., off-roading, bumpy roads, etc.), a collision, a system malfunction, an incorrect set-up of the physical connection 340, or the like.

At timestep 720, FIG. 7 illustrates a configuration of the trailer 310 following the trajectory associated with the vehicle 100. As previously discussed, the trailer 310 follows the trajectory of the vehicle 100 after receiving the trajectory over an established wireless connection between the vehicle 100 and the trailer 310 and after the trailer 310 activates the mobility component 320 to maneuver without the assistance of the vehicle 100. The control module 220 communicates the trajectory associated with the vehicle 100, where the trajectory may include steering controls, following distance controls, and speed controls for the trailer 310 to execute. At timestep 730, FIG. 7 illustrates an action shot of the vehicle 100 pulled over on the side of the road, and the trailer 310 executing a stop signal by pulling over behind the vehicle 100. As previously discussed, the control module 220 determines to send the stop signal to the trailer 310 if a safe pull over maneuver is feasible (e.g., if a clear path exists between the shoulder of the road and the vehicle 100). At timestep 740, FIG. 7 illustrates the vehicle 100 and trailer 310 pulled over on the side of the road after the stop signal has been successfully executed, where the vehicle 100 and the trailer 310 are both parked.

FIG. 1 will now be discussed in full detail as an example environment within which the system and methods disclosed herein may operate. In some instances, the vehicle 100 is configured to switch selectively between different modes of operation/control according to the direction of one or more modules/systems of the vehicle 100. In one approach, the modes include: 0, no automation; 1, driver assistance; 2, partial automation; 3, conditional automation; 4, high automation; and 5, full automation. In one or more arrangements, the vehicle 100 can be configured to operate in only a subset of possible modes.

In one or more embodiments, the vehicle 100 is an autonomous vehicle. As used herein, "autonomous vehicle" refers to a vehicle that is capable of operating in an autonomous mode (e.g., category 5, full automation). "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU), and application specific integrated circuit (ASIC), a microprocessor, etc. The vehicle 100 can include one or more data stores 115 for storing one or more types of data. The data store 115 can include volatile and/or non-volatile memory.

Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, and hard drives. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry.

In one or more arrangements, the map data 116 can include one or more terrain maps 117. The terrain map(s) 117 can include information about the terrain, roads, surfaces, and/or other features of one or more geographic areas. The terrain map(s) 117 can include elevation data in the one or more geographic areas. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles can include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information about one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means a device that can detect, and/or sense something. In at least one embodiment, the one or more sensors detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors may function independently or two or more of the sensors may function in combination. The sensor system 120 and/or the one or more sensors can be operatively connected to the processor(s) 110, the data store(s) 115, and/or another element of the vehicle 100. The sensor system 120 can produce observations about a portion of the environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect information about the vehicle 100 itself. In one or more arrangements, the vehicle sensor(s) 121 can be configured to detect position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect one or more characteristics of the vehicle 100 and/or a manner in which the vehicle 100 is operating. In one or more arrangements, the vehicle sensor(s) 121 can include a speedometer to determine a current speed of the vehicle 100.

Alternatively, or in addition, the sensor system 120 can include one or more environment sensors 122 configured to acquire data about an environment surrounding the vehicle 100 in which the vehicle 100 is operating. "Surrounding environment data" includes data about the external environment in which the vehicle is located or one or more portions thereof. For example, the one or more environment sensors 122 can be configured to sense obstacles in at least a portion of the external environment of the vehicle 100 and/or data about such obstacles. Such obstacles may be stationary objects and/or dynamic objects. The one or more environment sensors 122 can be configured to detect other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more of each of the following: radar sensors 123, LIDAR sensors 124, sonar sensors 125, weather sensors, haptic sensors, locational sensors, and/or one or more cameras 126. In one or more arrangements, the one or more cameras 126 can be high dynamic range (HDR) cameras, stereo or infrared (IR) cameras.

The vehicle 100 can include an input system 130. An "input system" includes components or arrangement or groups thereof that enable various entities to enter data into a machine. The input system 130 can receive an input from a vehicle occupant. The vehicle 100 can include an output system 135. An "output system" includes one or more components that facilitate presenting data to a vehicle occupant.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the trailer system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement of the vehicle 100. The processor(s) 110, the trailer system 170, and/or the autonomous driving module(s) 160 may control some or all of the vehicle systems 140 and, thus, may be partially or fully autonomous as defined by SAE 0 to 5.

The processor(s) 110, the trailer system 170, and/or the autonomous driving module(s) 160 can be operatively connected to communicate with the various vehicle systems 140 and/or individual components thereof. For example, returning to FIG. 1, the processor(s) 110, the trailer system 170, and/or the autonomous driving module(s) 160 can be in communication to send and/or receive information from the various vehicle systems 140 to control the movement. of the vehicle 100. The processor(s) 110, the trailer system 170, and/or the autonomous driving module(s) 160 may control some or all of the vehicle systems 140.

The processor(s) 110, the trailer system 170, and/or the autonomous driving module(s) 160 may be operable to control the navigation and maneuvering of the vehicle 100 by controlling one or more of the vehicle systems 140 and/or components thereof. For instance, when operating in an autonomous mode, the processor(s) 110, the trailer system 170, and/or the autonomous driving module(s) 160 can control the direction and/or speed of the vehicle 100. The processor(s) 110, the trailer system 170, and/or the autonomous driving module(s) 160 can cause the vehicle 100 to accelerate, decelerate, and/or change direction. As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be element or combination of elements operable to alter one or more of the vehicle systems 140 or components thereof to responsive to receiving signals or other inputs from the processor(s) 110 and/or the autonomous driving module(s) 160. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the trailer system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 240 as implemented by the occupancy module 230. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7 but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof

What is claimed is:

1. A system, comprising:
one or more processors;
a memory communicably coupled to the one or more processors and storing:
a control module including instructions that when executed by the one or more processors cause the one or more processors to in response to determining that a physical connection between a vehicle and a trailer has disconnected with no remaining physical connection therebetween, determine trajectory information for navigating the trailer without a connection to the vehicle and activate a mobility component to facilitate movement of the trailer;
communicate the trajectory information from the vehicle to the trailer to cause the trailer to follow a trajectory associated with the vehicle, including instructions for following the vehicle without the physical connection; and
monitor whether the trailer is following the trajectory, including: responsive to determining the trailer is not following the trajectory associated with the vehicle, communicating following information to cause the trailer to follow a second vehicle that was previously not associated with the vehicle and the trailer.

2. The system of claim 1, wherein the control module includes instructions to calculate the trajectory information from operating characteristics of the vehicle as extrapolated into a future path, including instructions to
receive control inputs from the vehicle, wherein the control inputs include at least one of speed controls, braking controls, following distance controls, and steering controls, and
cause the trailer to follow the trajectory associated with the vehicle.

3. The system of claim 1, wherein the control module includes instructions to communicate a stop signal to the trailer to end navigating the trailer including instructions to generate the stop signal according to at least one of: an electronic input from a machine interface controlled by a human driver and automatically based, at least in part, on a vehicle maneuver indicating an intention to stop navigating the trailer.

4. The system of claim 3, wherein the vehicle maneuver indicating an intention to stop navigating the trailer is at least one of: a vehicle pullover maneuver and a vehicle park maneuver.

5. The system of claim 1, wherein the control module includes instructions to determine that the physical connection has disconnected including instructions to acquire sensor data from one or more sensors associated with the vehicle, and wherein the sensor data includes at least image data of the trailer, and
wherein the mobility component is a gyroscope-based stabilizer.

6. The system of claim 5, wherein the control module includes instructions to use the image data to localize the trailer in a three-dimensional (3D) space,
wherein the control module includes instructions to determine, responsive to localizing the trailer in the 3D space, that the physical connection is disconnected when the trailer exceeds a threshold distance from the vehicle,
wherein the threshold distance is a defined distance the trailer may be located from the vehicle with a connected physical connection.

7. The system of claim 1, wherein the control module includes instructions to monitor whether the trailer is following the trajectory including instructions to compare the trajectory information with a real-time trajectory the trailer is following.

8. A non-transitory computer-readable medium including instructions that when executed by one or more processors cause the one or more processors to:
responsive to determining that a physical connection between a vehicle and a trailer has disconnected with no remaining physical connection therebetween, determine trajectory information for navigating the trailer without a connection to the vehicle and activate a mobility component to facilitate movement of the trailer;
communicate the trajectory information from the vehicle to the trailer to cause the trailer to follow a trajectory associated with the vehicle, including instructions for following the vehicle without the physical connection; and
monitor whether the trailer is following the trajectory, including instructions to, responsive to determining the trailer is not following the trajectory associated with the vehicle, communicate following information to cause the trailer to follow a second vehicle that was previously not associated with the vehicle and the trailer.

9. The non-transitory computer-readable medium of claim 8, wherein the instructions include instructions to communicate a stop signal to the trailer to end navigating the trailer by generating the stop signal according to at least one of: an electronic input from a machine interface controlled by a human driver and automatically based, at least in part, on a vehicle maneuver indicating an intention to stop navigating the trailer.

10. The non-transitory computer-readable medium of claim 8, wherein the instructions to monitor whether the trailer is following the trajectory includes instructions to compare the trajectory information with a real-time trajectory the trailer is following.

11. The non-transitory computer-readable medium of claim 8, wherein the instructions include instructions to determine that the physical connection between the vehicle and the trailer has disconnected includes acquiring sensor data from one or more sensors associated with the vehicle, wherein the sensor data includes at least image data of the trailer, and
wherein the mobility component is a gyroscope-based stabilizer.

12. A method, comprising:
responsive to determining that a physical connection between a vehicle and a trailer has disconnected with no remaining physical connection therebetween, determining trajectory information for navigating the trailer without a connection to the vehicle and activating a mobility component to facilitate movement of the trailer;
communicating the trajectory information from the vehicle to the trailer to cause the trailer to follow a trajectory associated with the vehicle, including instructions for following the vehicle without the physical connection; and
monitoring whether the trailer is following the trajectory, including responsive to determining the trailer is not following the trajectory associated with the vehicle, communicating following information to cause the trailer to follow a second vehicle that was previously not associated with the vehicle and the trailer.

13. The method of claim 12, wherein determining the trajectory information includes calculating the trajectory information from operating characteristics of the vehicle as extrapolated into a future path, including
receiving control inputs from the vehicle, wherein the control inputs include at least one of speed controls, braking controls, following distance controls, and steering controls; and
causing the trailer to follow the trajectory associated with the vehicle.

14. The method of claim 12, further comprising:
communicating a stop signal to the trailer to end navigating the trailer by generating the stop signal according to at least one of: an electronic input from a machine interface controlled by a human driver and automatically based, at least in part, on a vehicle maneuver indicating an intention to stop navigating the trailer.

15. The method of claim 12, wherein determining that the physical connection between the vehicle and the trailer has disconnected includes acquiring sensor data from one or more sensors associated with the vehicle, wherein the sensor data includes at least image data of the trailer, and
wherein the mobility component is a gyroscope-based stabilizer.

16. The method of claim 15, further comprising:
using the image data to localize the trailer in a three-dimensional (3D) space; and
determining, in response to localizing the trailer in the 3D space, that the physical connection is disconnected when the trailer exceeds a threshold distance from the vehicle
wherein the threshold distance is a defined distance the trailer may be located from the vehicle with a connected physical connection.

17. The method of claim 12, wherein monitoring whether the trailer is following the trajectory comprises comparing the trajectory information with a real-time trajectory the trailer is following.

* * * * *